United States Patent [19]
Warne

[11] Patent Number: 6,095,031
[45] Date of Patent: Aug. 1, 2000

[54] COMPUTER CONTROLLED BREWING APPARATUS

[75] Inventor: Thomas I. Warne, Oakville, Canada

[73] Assignee: Bloomfield Industries Canada Limited, Mississauga, Canada

[21] Appl. No.: 09/227,403

[22] Filed: Jan. 8, 1999

[51] Int. Cl.[7] ........................................ A47J 31/44
[52] U.S. Cl. .............................. 99/282; 99/283; 99/307
[58] Field of Search ............................ 99/280, 283, 282, 99/281, 307

[56] References Cited

U.S. PATENT DOCUMENTS

| | | | |
|---|---|---|---|
| 4,603,621 | 8/1986 | Roberts | 99/307 |
| 4,621,571 | 11/1986 | Roberts | 99/28 |
| 4,650,158 | 3/1987 | Roberts | 251/144 |
| 4,739,697 | 4/1988 | Roberts | 99/295 |
| 5,063,836 | 11/1991 | Patel | 99/282 X |
| 5,584,229 | 12/1996 | Anson | 99/280 |
| 5,647,055 | 7/1997 | Knepler | 99/280 X |

*Primary Examiner*—Reginald L. Alexander
*Attorney, Agent, or Firm*—Marks & Clerk

[57] ABSTRACT

Apparatus for brewing a beverage is disclosed. Typically, the brewed beverage is coffee, but it might be hot tea, iced tea, or soup. The beverage is brewed by delivering heated brew water to a product to be brewed by passing the heated brew water through the product to extract flavor therefrom. The brewed product is dispensed into a brewed beverage container. The apparatus includes a microprocessor, a controllable inlet valve for water entering the apparatus, and a controllable brew valve for delivery of heated brew water to the product. The inlet valve and the brew valve are under the control of the microprocessor, so that they may be opened or closed in keeping with signals sent thereto by the microprocessor. There is a control panel for the microprocessor, having a plurality of switches, each of which has a designated primary function for controlling a specific predesignated operating function of the brewing apparatus. Also, upon successful completion of a conditioning sequence of switch manipulations, each of the plurality of switches has a designated secondary function for controlling the microprocessor in setting specific operating parameters for specific predesignated operating features of the brewing apparatus. There is a timer for controlling the timing of any function requiring timing control under the control of the microprocessor; and a real time clock for permitting real time setting of any function requiring a real time setting control under the control of the microprocessor. The microprocessor may be controlled so that the specific predesignated operating functions, and the specific predesignated operating features of the brewing apparatus, may be preset for a specific type of brewing apparatus.

18 Claims, 6 Drawing Sheets

COMPUTER CONTROLLED BREWING APPARATUS

FIELD OF THE INVENTION

This invention relates to apparatus for brewing a selected quantity of a brewed beverage, such as coffee or tea, and more particularly this invention relates to a beverage brewing apparatus having a microprocessor controller. Thus, an electronic, computer controlled brewing apparatus is provided.

BACKGROUND OF THE INVENTION

Automatic coffee makers are found in many places in modern society. Particularly, they are found in large offices, restaurants, coffee shops, donut shops, and the like. Moreover, other automatic brewing apparatus than automatic coffee makers are found in such places as noted above, which other brewing apparatus is employed to brew tea, which may be served as either hot tea or iced tea, or to make a soup which may essentially be brewed using specially prepared soup concentrates. Any such brewed product which is made in batches by apparatus in keeping with the present invention will be termed to be a "brewed beverage". It will also be understood that, for the most part, it is coffee that will be particularly the brewed beverage which is to be made in apparatus in keeping with the present invention, but the following discussion is not limited to coffee brewers per se.

There are still many automatic coffee brewers in use which have electromechanical thermostats. They are set up so that a drop of as much as 10° F. in water temperature of the water heater tank of the coffee brewer, will be permitted before the water is reheated. Moreover, many such coffee brewers will dispense heated water into the brew basket at any time, irrespective of the temperature of the water. When coffee is brewed at a higher temperature, more flavor will be extracted from the coffee grounds; whereas, when coffee is brewed at a lower temperature, it will be weaker as the cooler brew water will not extract the maximum amount of flavor from the coffee grounds. This may also affect the shelf life of the brewed coffee, once made. For example, large batches of coffee which are dispensed into a container, such as a thermal container, airpot, or satellite container (all of which are discussed in greater detail hereafter), may have an acceptable shelf life for consumption of up to three hours, or possibly more, if the coffee was brewed at a higher temperature; but if brewed at a lower temperature, the brewed coffee may only have an acceptable shelf life of an hour, or less.

Many current brewers will allow a "double brew". This condition arises if the brew button is pushed a second time after the first brew has been partially completed. The result may be that the coffee carafe or other container into which the coffee is being dispensed may be overfilled and, occasionally, internal overfilling of the coffee brewer apparatus itself may occur.

Coffee brewers are exposed to severe operating conditions and extended service times, reducing the component lifetime of the parts and wasting energy if the brewer is not used during a particular period. Coffee brewers are often plugged in and left running for twenty-four hours per day, three-hundred-and-sixty-five days per year. While not in service—that is, while not actively brewing coffee, or when a brewing cycle is not imminent, such as overnight or on weekends in an office environment—the water in the water heater might be constantly reheated each time the water temperature falls below the lower limits set by the electromechanical thermostat and, therefore, energy is wasted as well as extensive wear on components is caused. The present invention will provide an electronically controlled, microprocessor-based brewing apparatus whereby a number of prior difficulties with former coffee brewers are overcome, and whereby a number of additional features may be provided. Such features will include the ability to choose various volumes for each batch to be brewed, thus permitting the brewed product to be dispensed into a carafe, a thermal container, an airpot, or a satellite container. However, such volume control choice is generally made at the factory, since the external dispensing structure for the beverage brewing apparatus will vary depending on the nature of the container into which the brewed beverage is to be dispensed.

Of course, many other features will be discussed in greater detail hereafter, including significant diagnostic programs that may be built into the microprocessor; the ability to display various instantaneous information concerning the status of the brewing apparatus, water temperature, and so on; the ability to maintain a history of the number of brewing operations per day over a period of time for the apparatus; and a program to determine whether any of the valves controlling water inlet or heated water outlet may be defective.

Particularly where an establishment, including an office, and more particularly including restaurants, coffee shops, donut shops, and the like, is employing the use of a modern beverage brewing apparatus in keeping with the present invention, there must be the ability to prepare large amounts of coffee and other brewed beverages in a relatively short period of time, such as during peak consumption periods, and also randomly at other times. Many such brewing apparatus may be called upon to have a brew volume of up to one-hundred-and-twenty-eight ounces, or more. More specific discussion concerning various brew batch sizes is given hereafter. However, no matter what size the batch may be, the control of water, especially in terms of the amount of water delivered, its temperature, and the rate at which the water is delivered, is of paramount importance. Of course, particularly for retail establishments such as restaurants, coffee shops, and donut shops, it may be desirable to have a number of different varieties of brewed coffee and other beverage available at any one time and, therefore, the use of a single brewing apparatus may require an element of programmability so that different varieties of coffee, for example, may be brewed using the optimum brewing cycle operations for that particular variety of coffee.

DESCRIPTION OF THE PRIOR ART

An earlier electronic brew control system, utilizing a form of microprocessor control, and providing an improved coffee brewer, is discussed in U.S. patent application No. 08/982,463 entitled ELECTRONIC BREW CONTROL SYSTEM, filed Dec. 2, 1997, now U.S. Pat. No. 5,862,738. That application is in the name of the present inventor, and is assigned to the common Assignee herewith.

Another earlier patent relating also to a microprocessor controlled apparatus is taught in WARNE U.S. Pat. No. 5,704,275, issued Jan. 6, 1998.

A further, commonly owned patent application which teaches a beverage brewing apparatus having a heated by-pass water delivery system which is particularly useful when brewing large batches of coffee or other brewed beverages, is taught in copending U.S. patent application Ser. No. 09/148,489 entitled BEVERAGE BREWING APPARATUS, filed Sep. 4, 1998, in the name of VAN-CAMP et al, now U.S. Pat. No. 5,901,634.

Other patents of interest include ROBERTS U.S. Pat. No. 4,621,571, issued Nov. 11, 1986. That patent teaches the use of insulated containers which are identified as satellite containers. The satellite containers generally include a low wattage heating element to help maintain the temperature of the coffee in the container at a desired dispensing and drinking temperature. The flavor degradation which occurs in glass carafes or decanters does not occur in insulated satellite containers. The brewer apparatus shown in that patent includes a by-pass outlet which is disposed above the edge of the brew chamber of the coffee brewer, such that water emanating therefrom is received into a special by-pass channel in the brew chamber. The by-pass channel permits the water to flow down the outer structure inside the brew chamber without passing through the coffee grounds therein, and into the container below. The flow of water through the by-pass valve is adjustable to meet brewing requirements.

Two further ROBERTS patents, U.S. Pat. No. 4,603,621 issued Aug. 5, 1986, and U.S. Pat. No. 4,650,158 issued Mar. 17, 1987, each disclose a beverage making device that permits the careful control of heating water used for brewing a brewed beverage. The object is that the heated water shall not be too hot. A safety thermostat quickly detects excessive temperatures in the hot water container. An improved spray disc assembly distributes the brew water over the product being brewed in the brew basket.

SUMMARY OF THE INVENTION

Briefly, an objective of the present invention is to provide an improved electronically computer controlled brewer apparatus which, depending on its particular embodiment and physical make-up, may be employed for the production of brewed products such as coffee, tea, soups, and the like. The apparatus may be preset to provide one of a number of different brew batch sizes, so that common elements, including a common microprocessor and electronic control board, may be utilized for a number of different embodiments of brewing apparatus in keeping with the present invention. Accordingly, manufacturing costs for a wide variety of brewing apparatus may be kept lower as a consequence of the use of common elements, thereby permitting the provision of such beverage brewing apparatus to the market as economically as possible.

The present invention provides a microprocessor-controlled brewing apparatus which overcomes a number of shortcomings of the prior art, as discussed above and as further noted hereafter.

In a particular, illustrative embodiment of the present invention, there is provided an apparatus for brewing a beverage, wherein the beverage is brewed by heating water and delivering heated brew water to a product to be brewed by passing the heated brew water through the product to extract flavor therefrom, and then dispensing the brewed product into a brewed beverage container provided therefor. When the brewed beverage is to be a warm beverage, means are provided to keep the brewed beverage warm. Apparatus in keeping with the present invention comprises a microprocessor, a water heater tank having a controllable heating element therein, delivery means operatively coupled to the water heater tank to initiate a brewing cycle and to deliver a predetermined volume of brew water which is delivered to a first predetermined temperature below boiling to the product during each selected brewing cycle, temperature detecting means for determining the temperature of the heated water at any time under the control of the microprocessor and for initiating a heating cycle for the heated water whenever its temperature drops below a second predetermined temperature which is lower than the first predetermined temperature, and actuator means to preclude delivery of the heated water to the product when the temperature thereof is below the predetermined temperature. The apparatus further comprises a brew chamber for retaining the product therein, wherein heated brew water will pass through the product in order to extract flavor therefrom, and wherein the heated brew water will subsequently pass from the brew chamber into the brewed beverage container. The apparatus further comprises a controllable inlet valve for water entering the heater tank, where the inlet valve is under the control of the microprocessor whereby the controllable valve can be opened or closed in keeping with signals sent thereto by the microprocessor. Still further, there is a controllable brew valve for delivery of the heated brew water to the product, which brew valve is also under the control of the microprocessor so that it can be opened or closed in keeping with signals sent thereto by the microprocessor. A control panel for the microprocessor is provided, the control panel having a plurality of switches each having a designated primary function for controlling a specific predesignated operating function of the brewing apparatus, and wherein the switches are also such that, upon successful completion of a conditioning sequence of switch manipulations, each of the plurality of switches has a designated secondary function for controlling the microprocessor in setting specific operating parameters for specific predesignated operating features of the brewing apparatus. There is a timer means associated with the microprocessor for controlling the timing of any function requiring timing control under the control of the microprocessor; and there is a real time clock associated with the microprocessor for permitting real time setting for any function requiring a real time setting control under the control of the microprocessor. Thus, the microprocessor may be controlled so that specific predesignated operating functions of the brewing apparatus, and the specific predesignated operating features thereof, may be preset for a specific type of brewing apparatus.

In keeping with the present invention, the specific type of brewing apparatus is generally one of the group which consists of decanter coffee brewers, thermal coffee brewers, airpot coffee brewers, iced tea brewers, hot tea brewers, hot soup brewers, and satellite coffee brewers.

It is noted above that the control panel for the microprocessor has a plurality of switches. A particular embodiment of the present invention comprises six switches on the control panel, each of which has a designated primary function and a designated secondary function.

In keeping with a particular feature of the present invention, the temperature detector means comprises a temperature probe which is adapted to determine the temperature of the water in the heater tank at any instant in time, and to provide a signal indicative of that temperature to the microprocessor under the control thereof.

Likewise, the present invention provides a water level sensor near the top of the water heater tank, with the water level detector being adapted to sense the presence or absence of water in the tank at the level therein where the water level sensor is placed, and to provide a signal indicative of the presence or absence of water at that water level sensor to the microprocessor under the control thereof.

The present invention provides for an LCD display panel associated with the microprocessor for display of data output from the microprocessor under the control thereof. In another aspect of the present invention, the microprocessor may be controlled by the plurality of switches so as to determine the nature of the data being displayed by the LCD display panel at any instant in time. Other typical display panels which are also employed include vacuum fluorescent panels.

A particular feature of the present invention is that each of the controllable inlet valve and controllable brew valve is a solenoid operated valve. The respective solenoid is energized under the control of the microprocessor so as to open that particular valve, and the valve remains open only when its respective solenoid is energized. Thus, each of the controllable inlet valve and the controllable brew valve may be opened at any instant in time under the control of the microprocessor.

Still further, each of the respective solenoids for the controllable inlet valve and the controllable brew valve has a pair of triacs in series with the respective solenoid. When either of the controllable inlet valve and the controllable brew valve is not open under the control of the microprocessor, a first one of the pair of triacs associated with that respective valve is periodically opened and the other of the pair of triacs associated with that respect triacs is closed under the control of the microprocessor. The microprocessor tests to determine if the respective solenoid associated with that respective valve is energized. Then, a second one of the pair of triacs associated with that respective valve is opened and the other of the pair of triacs associated with that respective valve is closed, again under the control of the microprocessor, and the microprocessor again tests to determine if the respective solenoid associated with that respective valve is energized. If, under either condition of one of the pair of triacs being opened and the other of the pair of triacs being closed, for a respective valve, the microprocessor determines that the respective solenoid for that respective valve is energized, then the microprocessor will cause the operation of the brewing apparatus to stop forthwith, and will cause an alarm indication to be given on an alarm indicator associated with the brewing apparatus.

In keeping with another aspect of the present invention, at the beginning of a selected brewing cycle, the controllable brew valve may be opened under the control of the microprocessor and its associated timer means for a short period of time, so as to allow a small amount of heated water to pre-infuse the product by soaking it with a small amount of heated brew water.

Another feature of the present invention comprises a by-pass water delivery means connected in water receiving relation to the water heater tank and terminating in a by-pass water outlet disposed in direct water dispensing relation to the brewed beverage container below the brew chamber. The by-pass delivery means has a selectively operable by-pass water valve to control the flow of by-pass water from the by-pass water outlet directly into the brewed beverage container, under the control of the microprocessor. When the by-pass delivery means is used in a brewing apparatus which is specifically configured to make batches of iced tea into large, satellite-like containers, the by-pass is arranged to deliver cold by-pass water directly form the incoming water supply to the brewed beverage satellite-like container.

The present invention provides for the microprocessor to pulse the controllable brew valve in association with the timer means associated with the microprocessor, so as to produce an intermittent delivery of the heated brew water to the product in the brew chamber. Thus, the product in the brew chamber may be exposed to heated brew water for a longer period of time in any selected brewing cycle. Moreover, overflow of the brew chamber by the heated brew water may be substantially precluded.

Another feature of the present invention provides that the microprocessor and the real time clock are arranged to determine the number of brewing cycles undergone by the brewing apparatus per twenty-four hour day, and to maintain a record of the number of brewing cycles undergone by the brewing apparatus per twenty-four hour day for a predetermined number of consecutive twenty-four hour days.

In keeping with yet another aspect of the present invention, the microprocessor and its associated timer means may be arranged to control the controllable brew valve so as to deliver one of a plurality of preselected volumes of heated brew water to the product.

Yet another aspect of the present invention is to provide that the microprocessor, its associated real time clock and its associated timer means, may be arranged so as to begin any preselected functional cycle of the brewing apparatus, depending on the time of the day and the day of the week as determined by the real time clock.

In yet another aspect of the present invention, a water filter may be provided in series with the controllable inlet valve, and the microprocessor and its associated timer means are arranged to keep a running total time that the controllable inlet valve has been open. Thus, when a predetermined total time has been reached, a signal is given by the microprocessor to annunciator means therefor, so as to warn that the water filter will need to be changed.

When the brewing apparatus in keeping with the present invention has six switches on the control panel for the microprocessor, each of the switches has a specific secondary function assigned to it, as discussed in greater detail hereafter.

Of course, the present invention provides warming means for keeping a brewed beverage warm. The warming means may be chosen from the means consisting of at least one warmer plate on which a carafe of brewed beverage may be placed, at least one thermal carafe, at least one airpot, and at least one satellite container for brewed beverages.

A particular advantage of the present invention is the universality of common electronic microprocessor and motherboard units, notwithstanding the configuration of the brewing apparatus in which they are employed. Thus, instead of the requirement for individual adjustments of values, switches, etc., for any given brewing apparatus configuration, a simple matter of microprocessor programming is all that is required for any specific embodiment of brewing apparatus.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
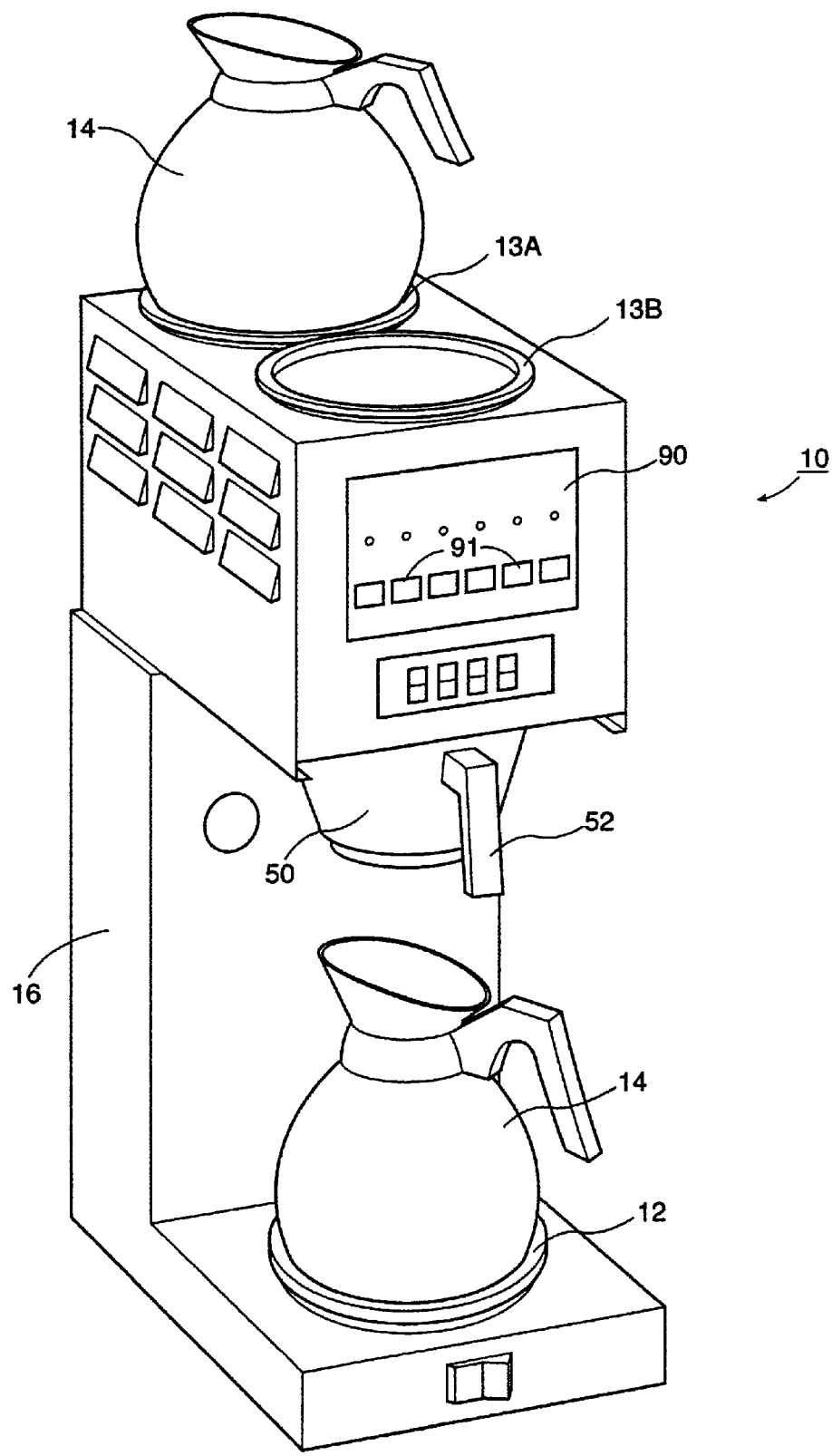
FIG. 1 is a perspective view of a typical first type of brewer apparatus which comprises the microprocessor-controlled features of the present invention.
Figure 2:
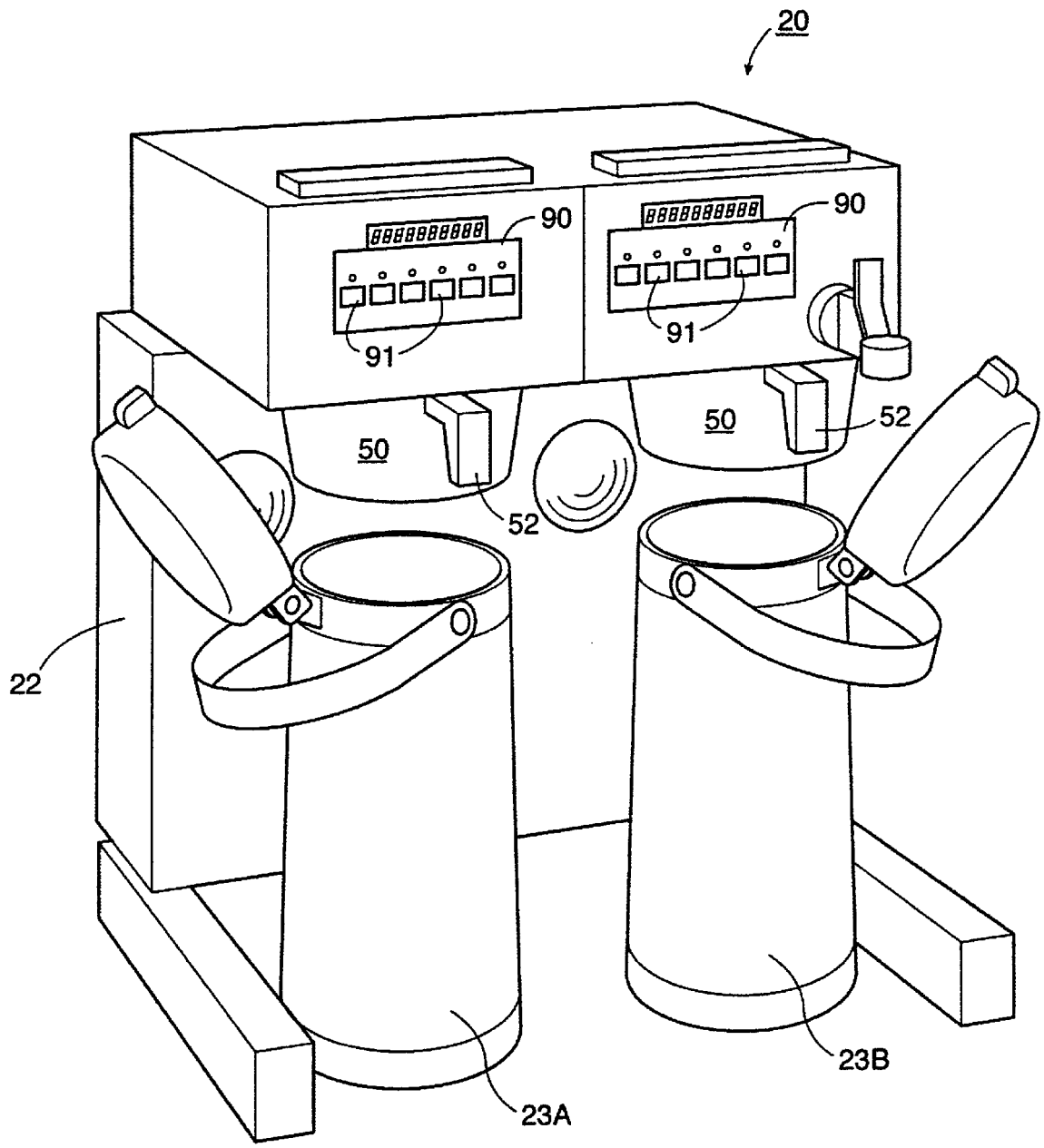
FIG. 2 is a perspective view of a typical second type of brewer apparatus which comprises the microprocessor-controlled features of the present invention.
Figure 3:
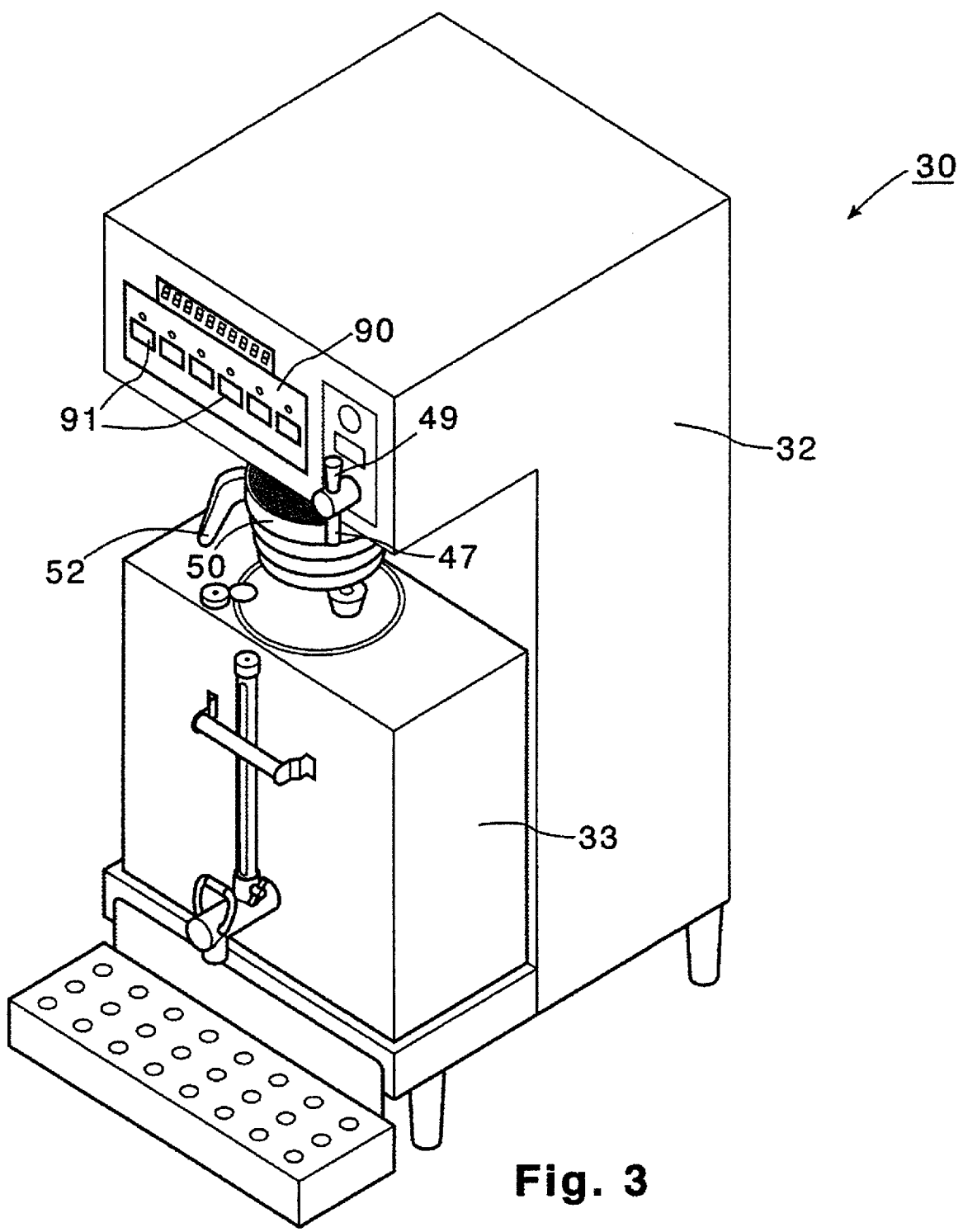
FIG. 3 is a perspective view of a typical third type of brewer apparatus which comprises the microprocessor-controlled features of the present invention.

Reference will now be made to FIGS. 1 through 3. Those figures show three different typical embodiments of brewing apparatus in keeping with the present invention. FIG. 1 shows a typical decanter coffee brewer 10; FIG. 2 shows a typical thermal coffee brewer 20; and FIG. 3 shows a typical satellite coffee brewer 30. Some further, more detailed, discussion of each of those typical embodiments follows hereafter. What should be noted, however, is that any of the apparatus for brewing beverages, in keeping with the present invention, will have a number of common elements, as well as distinctly different elements which, however, will be more particularly related to the specific nature of the brewing apparatus.

Also, except when the beverage to be brewed is intended to be iced tea, any beverage brewing apparatus in keeping with the present invention will be provided with a means for keeping the brewed beverage warm.

For example, the brewing apparatus 10 of FIG. 1 provides, in the embodiment shown, a primary warming plate 12, and two supplemental warming plates 13A and 13B, onto which a typical carafe or decanter for coffee can be placed. Likewise, the brewing apparatus 20 of FIG. 2 is arranged, in the embodiment shown, to dispense brewed coffee into one or the other of two thermal containers 23A or 23B. However, it should also be noted that the thermal containers 23A and 23B might also be replaced by airpots, with very few changes being made to the coffee brewing apparatus otherwise. However, it will be noted that, in general, the capacity of a thermal container is somewhat different than that of an airpot. Likewise, the brewing apparatus 30 of FIG. 3 is shown to be of the type which will dispense coffee (or other brewed beverage) into a satellite container 33. Typically, the satellite container 33 is then moved to another site, and plugged in using its own docking arrangement, so that it may be replaced by yet another satellite container for continued brewing of an additional or further batches of coffee or other brewed beverage.

Typically, each satellite container 33 is equipped with a docking station connector 35 (shown in FIG. 4) by which the satellite container 33 may be moved to a docking station and reconnected. The satellite container has a low wattage heating element installed therein, which is sufficient to maintain the brewed beverage which is dispensed into the satellite container at a suitable temperature for drinking. The base 37 of the satellite container is a non-heated base, for safety purposes. The brewed beverage contained in the satellite container 33 may be dispensed therefrom at the dispenser 38, operated by its handle 39.

It has been noted that the brewed beverage might also be hot tea, iced tea, or hot soup, for example. Typically, hot tea may be brewed into similar containers as coffee—that is, into carafes or decanters, a thermal container or an airpot, or into a satellite-type container. Also, typically, iced tea is dispensed into containers which are not dissimilar to satellite containers, due to the requirement for employment of a by-pass water supply system for the product as it is being brewed, as discussed hereafter.

Figure 4:
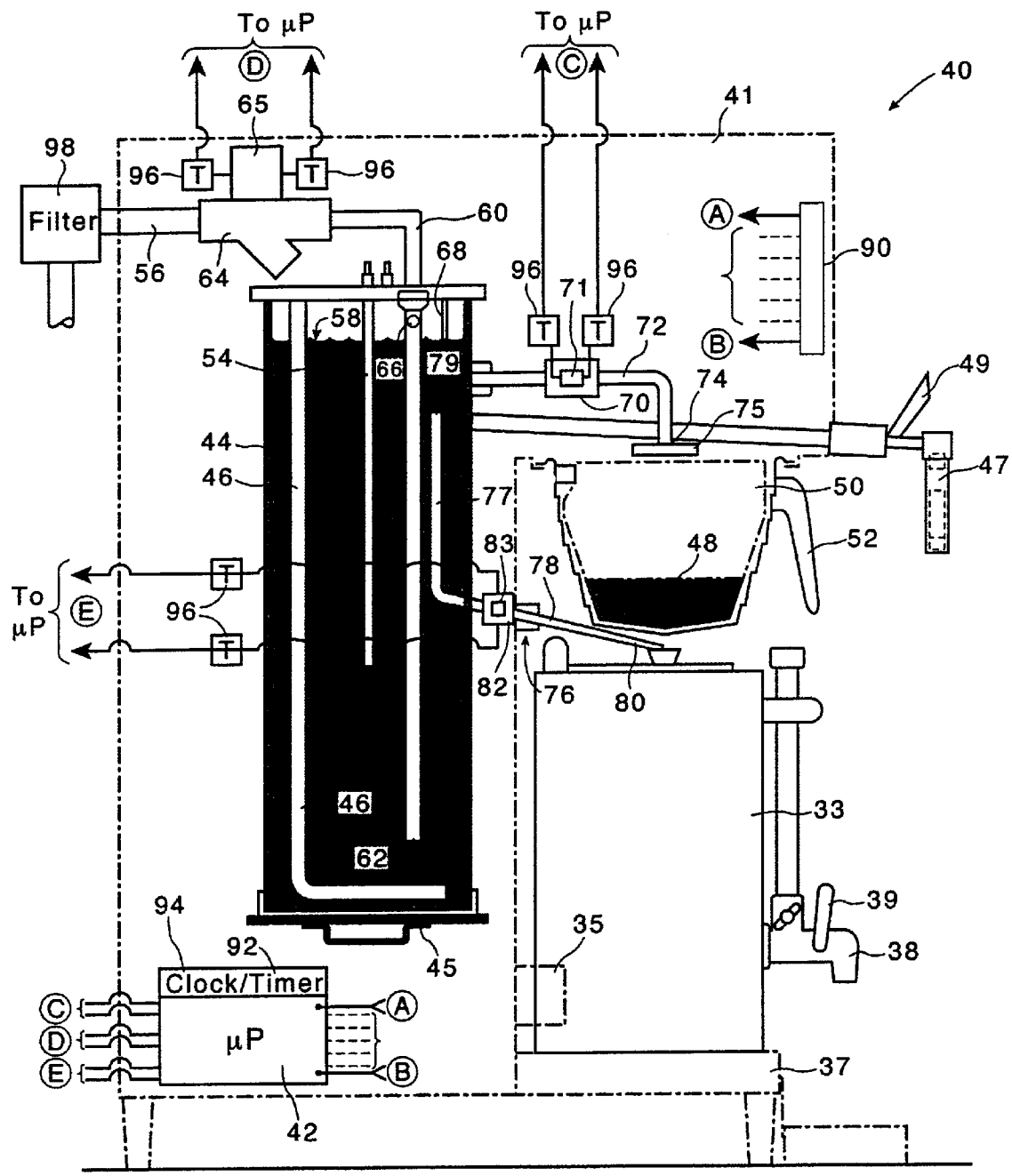
FIG. 4 is a side elevational view of an apparatus in keeping with the present invention, particularly of the sort shown in FIG. 3.

Reference is also made to FIG. 4, which shows a typical brewing apparatus in keeping with the present invention, but in an embodiment which is similar to that shown in FIG. 3. It will be recognized, however, that a number of the features and specific items shown in FIG. 4 may be found in any of the embodiments of FIGS. 1, 2, or 3. The apparatus of FIG. 4 is identified by the reference numeral 40. On the other hand, common elements which are shown in FIG. 4 and which will also be found in embodiments of FIGS. 1, 2, and 3, and also of which certain common elements are found in FIG. 5, will share identical reference numerals in the discussion which follows.

Each brewing apparatus in keeping with the present invention comprises a microprocessor 42. In each case, there is a water heater tank 44, which is housed in the housing 16 of FIG. 1, housing 22 of FIG. 2, or housing 32 of FIG. 3. In each case, there is a controllable heating element 46 installed in the water tank 44. Delivery means are provided and operatively coupled to the water heater tank 44 to initiate a brewing cycle, all as discussed hereafter. The delivery means will deliver a predetermined volume of heated brew water, which water is heated to at least a first predetermined temperature below boiling, to the product shown generally at 48 so as to extract flavor therefrom. The product 48 is contained in a brew chamber 50, having a handle 52 for purposes of replacing and changing the brew chamber with fresh product 48 therein for the next batch of brewed beverage to be brewed. Of course, the product 48 is generally coffee grounds, but it may also be a base for soup, or tea leaves or other tea extract and flavorings, etc.

Of course, so as to control the temperature of the water inside the water heater tank, a temperature detection means is provided. Typically, the temperature detection means may comprise a thermistor installed on a probe 54. The temperature detection means, in any event, is arranged to determine the temperature of the heated water in the water heater tank 44 at any time under the control of the microprocessor 42, and it will initiate a heating cycle for the heated water whenever the temperature of the heated water drops below a second predetermined temperature which is lower than the first predetermined temperature. For example, it is not uncommon that, for installations of brewing apparatus in keeping with the present invention in locations where the altitude above sea level is less than about 1,000 feet, the temperature of the water in the water heater tank is maintained at a temperature of 201° F. to 205° F. Any beverage brewing apparatus in keeping with the present invention is provided with suitable actuator means (not shown) to preclude delivery of the heated water from the water heater tank 44 to the product 48 in the event that the temperature of the heated water is below a predetermined temperature. Indeed, as will be noted hereafter, apparatus in keeping with the present invention is sufficiently programmable and flexible that differing brewing temperatures can be established for different varieties of coffee, for example.

The temperature probe 54 which is inserted into the water heater tank 44 is, as noted, connected to the microprocessor 42. Thus, at any instant in time, either under the control of a specific program which is directing operation of the brewing apparatus in keeping with the general instructions produced by the microprocessor for a specific brewing operation, or under operator intervention (if permitted), the instantaneous temperature of the water in the water heater tank will be determined and a signal indicative of that temperature will be sent to the microprocessor 42. That temperature may be displayed on a display panel therefor, as will be noted hereafter.

Conveniently, the brewing apparatus 30 is also provided with a gravity-type hot water dispenser 47, which is operated by a handle 49. This permits hot water to be dispensed for use in making beverages such as hot chocolate or the like, which are not brewed but which require a source of hot water in order to be made.

Referring as well to FIG. 4, and to some of the common elements which will be found in any brewing apparatus in keeping with the present invention, there will be found within the housing 41 a water supply line 56, which is shown entering the water heater tank 44 above a controlled water level 58. The water supply line 56 is directed down into the water heater tank 44 at 60, terminates in an outlet 62 which is disposed within the water heater tank 44 adjacent the bottom 45 thereof. There is a controllable inlet valve 64, which is described in greater detail hereafter. It will be noted that the water supply line also includes an anti-siphoning aperture 66 in the region below the entry elbow 60, but disposed one or two centimetres above the controlled water level 58. The anti-siphoning aperture 66 precludes the water in the water heater tank 44 from being drawn in a reverse direction into the water supply line 56 in the event that the water pressure in the water supply line 56 drops to a negative value.

There is also a water level sensor 68 mounted within the water heater tank 44 at the controlled water level 58. The water level sensor 68 acts in conjunction with the microprocessor 42 to control the admission of water into the water heater tank 44 and, thus, to maintain the level of the water in the water heater tank at the controlled level 58. Moreover, in the event that the water level has fallen below the controlled level 58, and the controllable inlet valve 64 has failed to open for any reason, the water level sensor 68 will sense the absence of water in the tank and, under the control of the microprocessor 42, it will provide a signal which is indicative of the absence of water at the water level sensor 68 to the microprocessor 42 under the control of the microprocessor.

Some brief description of the water delivery system for delivering heated brew water to the product 48 now follows. Each brewing apparatus, in keeping with the present invention, is provided with a controllable brew valve 70, associated with a delivery tube 72, of which the exit end 74 terminates in a spray head 75, particularly if the product 48 is coffee. It will be noted that the delivery tube 72 draws heated brew water from the water heater tank 44 at a level below the controlled water level 58.

Particularly when the brewing apparatus is a satellite brewing apparatus of the sort shown in FIG. 3, and as being described in FIG. 4, it also comprises a by-pass water delivery means identified generally at 76. The by-pass delivery means comprises a standpipe 77 which is connected into the water heater tank 44. The standpipe 77 terminates in an open top end 79 which is disposed in the region adjacent the controlled water level 58, preferably one or two centimetres below that controlled water level 58. The structure of the by-pass water delivery system 76 also comprises a by-pass delivery pipe 78, which terminates in an outlet at 80. A more complete discussion and description of the by-pass water supply arrangement, and the manner in which it works in association with satellite containers, will be found in the VANCAMP et al patent, noted above. The by-pass water delivery system also includes a controllable valve 82, which is discussed in greater detail hereafter.

Each of the controllable inlet valve 64, the controllable brew valve 70, and the controllable by-pass water delivery valve 82, is a solenoid operating valve, having solenoids 65, 71, and 83, respectively. The solenoids are connected to the microprocessor, the particulars of the connection of each solenoid being described hereafter. In any event, it will be noted that each of the controllable inlet valve 64, the controllable brew valve 70, and the controllable by-pass water valve 82, is such that it will be opened or closed only in keeping with signals which are sent thereto by the microprocessor.

Thus, each of the controllable inlet valve 64, the controllable brew valve 70, and the controllable by-pass water valve 82, is a solenoid operated valve under the control of its respective solenoid 65, 71, or 83, respectively. Each of those valves is such that, when the respective solenoid is energized under the control of the microprocessor 42, the valve will then be opened. The valve will remain open only while its respective solenoid is energized. Therefore, each of the solenoid operated valves 64, 70, and 82, may be opened at any instant in time under the control of the microprocessor 42. Such control of the valves is, of course, important, and comes as a consequence of a number of features of the present invention, whereby specific predesignated operating functions of the brewing apparatus, and specific predesignated operating features of the brewing apparatus, may be preset and will be functional under the control of the microprocessor. Examples of such predesignated operating functions and predesignated operating features, and their control by the microprocessor, are discussed hereafter.

Each of the solenoids 65, 71, and 83 of the controllable inlet valve 64, the controllable brew valve 70, and the controllable by-pass water valve 82, respectively, is connected in series with a pair of triacs 96. That is to say, the connection between each of the respective solenoids 65, 71, 83 and the microprocessor 42 is, in each case, in series connection with a pair of triacs 96.

The purpose for this arrangement is to determine if the respective controllable valves 64, 70, and 82 are operating correctly. It has been noted above that each valve is intended only to be open when its respective solenoid has been energized. Accordingly, the microprocessor 42 can be set to test each of the controllable valves 64, 70, and 82, at any time when the respective controllable valve is not intended to be open under the control of the microprocessor. In other words, the respective solenoid of the valve to be tested should not be energized. The testing procedure is as follows:

Under the control of the microprocessor 42, a first one of the pair of triacs 96 associated with the respective solenoid of the controllable valve to be tested is opened, and the other of the same pair of triacs 96 associated with that same solenoid is closed. The microprocessor then tests to determine if the solenoid is, in fact, energized. Then, the first of the same pair of triacs 96 is closed, and the other triac is opened, and the microprocessor again tests to determine if the solenoid is energized. If, under either condition of one of the pair of triacs being opened and the other of the pair of triacs being closed, the microprocessor determines that the respective solenoid is energized, then a determination has been made that the valve is open when it should not be open. Accordingly, the microprocessor 42 will cause the operation of the entire brewing apparatus to stop forthwith. The microprocessor 42 will also cause an alarm indication to be given on an alarm indicator, which may be on the display panel discussed hereafter, or may be any other appropriate alarm indicator including a flashing LED, a buzzer, or combinations thereof.

Figure 5:
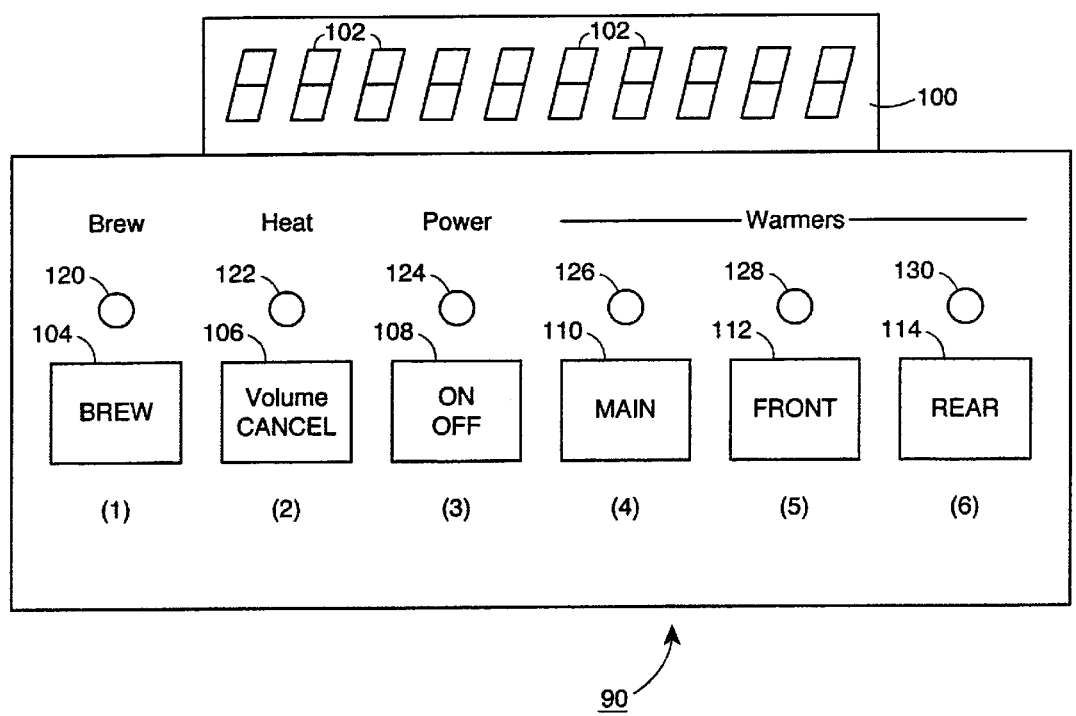
FIG. 5 shows a typical layout for a control panel and associated LCD display, in keeping with the present invention.

A control panel 90 is provided for the microprocessor. As shown in each of FIGS. 1, 2, 3, and 4, the control panel 90—or, in the case of FIG. 2, two control panels 90—are mounted in the upper region of the specific beverage brewing apparatus which is illustrated, and each control panel 90 is located at a convenient location for ease of access. The control panel is shown in FIG. 5, and will be discussed in greater detail hereafter.

It will be noted that the control panel has a plurality of switches generally indicated at 91 in each of FIGS. 1 through 4; and, as described hereafter, each switch has a designated primary function for controlling a specific predesignated operating function of the brewing apparatus. Moreover, each switch 91 is also arranged so that, upon successful completion of a conditioning sequence of switch manipulations, as discussed hereafter, each of the switches 91 also has a designated secondary function for controlling the microprocessor 42 in setting specific operating parameters for specific predesignated operating features of the brewing apparatus.

Associated with the microprocessor 42 there is a timer 92 and a real time clock 94. The timer 92 permits the controlling of the timing of any function which requires timing control under the control of the microprocessor 42, as described hereafter. Likewise, the real time clock 94 permits a real time setting of any function which requires a real time setting control under the control of the microprocessor 42. As described hereafter, the microprocessor 42 may thus be controlled so that the specific predesignated operating functions of the brewing apparatus in keeping with the present invention, and the specific predesignated operating features of the brewing apparatus in keeping with the present invention, may be preset for any specific type of brewing apparatus.

Accordingly, the operating functions and operating features of a brewing apparatus 10 may be significantly different, as will be noted hereafter, than those for a brewing apparatus 20, or a brewing apparatus 30. Such differences will include the matter of control of the batch size for each batch of brewed beverage to be made when a brewing operation is initiated; the brewing apparatus may be set up for different types of beverage such as coffee, hot tea, iced tea, or soup; and it will be noted hereafter that certain modifications may be made from batch to batch, such as to accommodate various varieties of coffee—certain blends, certain roasts, flavored coffees, etc.—which may be intended to be brewed in any specific brewing operation.

Referring now to FIG. 5, there is shown a typical layout for a control panel 90 and a typical display panel 100. The display panel 100 may have any convenient appearance, but generally it comprises a plurality of individually addressable LCD display elements 102. Typically, each display element 102 comprises a seven element display, by which an entire range of alphanumeric characters can be individually created under the control of the microprocessor 42. Typical data which may be displayed on the display panel 100 are described hereafter.

The control panel 90 is arranged with six switches which are typically membrane switches or the like physically located behind actuator touch pads therefor. Typical actuator touch pads are shown in FIG. 5 at 104, 106, 108, 110, 112, and 114. They are also noted as being switches (1), (2), (3), (4), (5), and (6), respectively. The legends that are written on the respective touch pads for the switches are discussed hereafter.

Conveniently, the control panel 90 is also provided with a plurality of LEDs 120, 122, 124, 126, 128, and 130. Generally, LEDs 120, 122, and 124 are arranged to annunciate whether a brew cycle is in effect, whether the heating element is on, and indeed whether the power to the unit is on. The other LEDs may have varying functions; for example, in a brewing apparatus such as apparatus 10 shown in FIG. 1, LEDs 126, 128, and 130 will provide an indication as to whether the respective identified warmer plates are on. Other functions may also be assigned to the switches 110, 112, 114, and other purposes would be assigned to the LED displays 126, 128, and 130.

It has been noted above that specific predesignated operating functions of any brewing apparatus in keeping with the present invention, and specific predesignated operating features of any brewing apparatus in keeping with the present invention, may be preset for a specific type of brewing apparatus. Those arrangements are discussed below, whereby the programming steps for the microprocessor 42 are described. The microprocessor 42 may be programmed so as to control a number of functions and features; and it must be noted that a particular advantage of the present invention is that a common microprocessor and motherboard may be provided for widely varying brewing apparatus where the precise operating functions and operating features of any particular brewing apparatus are determined by the manner in which the microprocessor has been programmed. This permits economies of scale, because of the universality of the electronics components which are provided for any brewing apparatus. Of course, once a microprocessor has been specifically programmed in respect of principal operating functions for a particular type of brewing apparatus, it must be installed in that kind of brewing apparatus, or it must be completely reprogrammed for the brewing apparatus in which it is installed.

Each of switches 104, 106, 108, 110, 112, and 114 is assigned a specific predesignated operating function, as noted above. For example, pressing switch 104 will initiate a brew cycle; whereas pressing switch 106 will cancel the brew cycle; operation of switch 108 will turn the brewing apparatus on or off; typically, pressing switch 110 will turn on the main warmer plate 12 of an apparatus 10 as shown in FIG. 1; pressing switch 112 will turn on warm plate 13B; and pressing switch 114 will turn on warmer plate 13A. The associated LEDs will annunciate whether the specific predesignated operating function has, in fact, been initiated.

Moreover, each of the switches 104, 106, 108, 110, 112, and 114 may be assigned a secondary function, by which specific predesignated operating features of the specific type of brewing apparatus may be selected. The secondary functions, therefore, will set specific operating parameters for specific predesignated operating features of the brewing apparatus in which any particular microprocessor and its motherboard are installed. However, it is not possible to access the secondary functions for each of the switches without first completing a conditioning sequence of switch manipulations. Two typical such switch manipulations are as follows:

First, after the brewing apparatus has first been turned off, two of the switches—for example, switches 110 and 114— can be depressed and held depressed for at least three seconds. The LCD display 100 will then display the legend "BREW SETTINGS". Alternatively, a sequence of switches may be pressed, one after another and in a particular order. For example, switch 108, switch 110, switch 108, switch 110, switch 108, switch 108, switch 110, switch 110. Likewise, upon successful completion of that conditioning sequence of switch manipulations, the LCD display will display the suitable legend, such as "BREW SETTINGS" or such other legend as may be appropriate.

There are a number of specific predesignated operating features which may then be accessed through programming of the microprocessor 42 using the switches on the control panel 90. Those specific predesignated operating features may include any or all of the following:

- a pre-infusion cycle for the product 48, especially when it is coffee grounds, may be initiated;
- several pulse brew cycles, having different features, may be initiated;
- the specific operating brewing temperature required for a particular type of product—usually a particular roast, blend, or flavored coffee—may be chosen;
- when the brewing apparatus is first being set up, a different brewer configuration may be established having widely different volumes of heated brew water to be delivered during each brewing cycle to the product 48 in the brew chamber 50, and thence to the respective container for the brewed beverage;
- the number of brewing cycles undergone by the brewing apparatus per twenty-four hour day, and the number of brewing cycles undergone by the brewing apparatus per twenty-four hour day for a predetermined number of consecutive twenty-four hour days, may be recorded in suitable memory means associated with the microprocessor, for display under the control of the microprocessor with suitable switch manipulation of the switches on the control panel 90;
- a self diagnostic system, including a service diagnostic program which is available for qualified service personnel, is accessible;
- the temperature probe 54 may be calibrated;
- faulty valve detection, as discussed above, may be initiated, or may be established for periodic actuation;
- the real time clock will be set;
- the total elapsed time that the inlet valve 64 has been operating is measured and kept, whereby a preventative maintenance signal may be given after the elapsed time reaches a predesignated number of hours; and/or
- in certain circumstances, it may be possible to initialize the microprocessor so that additional program features, or reprogramming, may be downloaded to the microprocessor from a personal computer; additionally, the microprocessor code may be uploaded to a personal computer for such purposes as analysis, debugging, etc.

A number of the above specific operating parameters for specific predesignated operating features of the brewing apparatus in keeping with the present invention are now discussed:

First, a typical assignment of secondary functions to each of the switches 104, 106, 108, 110, 112, and 114, is as follows:

| SWITCH NO. | SECONDARY PROGRAM FUNCTION |
|---|---|
| 1 | Advance to next menu |
| 2 | Exit programming mode |
| 3 | Select item and advance to next item |
| 4 | Select pulse mode of operation |
| 5 | Decrement value of parameter in that menu item |
| 6 | Increment value of parameter in that menu item. |

It has been noted that a particular feature of the present invention is that the specific nature of the brewing apparatus in which any given microprocessor and its associated motherboard is installed is established. For example, a standard glass decanter such as decanter 14 used in association with brewing apparatus 10 of FIG. 1 will have a volume of sixty-four fluid ounces. The controllable inlet valve 64 and the controllable brew valve 70 may be operated so as to ensure that an appropriate amount of heated brew water is dispensed. More specifically, control of the controllable brew valve 70 by the microprocessor 42 is undertaken, and typically sixty-four fluid ounces of heated brew water is delivered to a carafe 14 in 190 seconds.

Of course, as the heated brew water is being delivered, the water level sensor 68 and the microprocessor 42 will determine that the controllable inlet valve 64 must also be opened so as to make up the water volume which is being dispensed.

By appropriate assignment of a function to one of the switches, it is possible that the same brewing apparatus 110 can also be programmed to delivery thirty-two ounces of heated brew water to a smaller quantity of product 48, and thus delivery of one-half of a standard glass decanter or carafe volume is accomplished.

A typical thermal server such as 23A or 23B has a capacity of 2.5 litres or 85 fluid ounces. A typical delivery time for heated brew water for such a container is 252 seconds. A typical airpot, on the other hand, has a capacity of 2.2 litres or 74 fluid ounces; and the length of the brewing cycle is 219 seconds.

Referring to the secondary program functions which may be assigned to each switch, some brief discussion of each function now follows:

Once the programming mode has been entered, depression of switch 104 will advance the programming to the next specific menu in the microprocessor. Those menus may vary from time to time, but may include such menus as brew settings, time functions, service and counter programming, machine settings, and factory settings.

Depression of switch 106 will exit the programming mode. If such step is taken, then it will be necessary to re-initiate the conditioning sequence of switch manipulations to re-enter a programming mode.

In any of the menu items which is displayed as switch 104 is successively actuated, depression of switch 108 will select that particular menu and will begin parameter selection for that particular menu item.

Actuation of switch 110 will select a particular pulse mode of operation, as discussed hereafter.

In any menu item which has been selected, the value of a parameter to be programmed may be decremented by actuation of switch 112, or incremented by actuation of switch 114.

Certain specific operating features of any brewing apparatus in keeping with the present invention, as they may be controlled by the microprocessor 42, are now discussed.

The microprocessor 42 and real time clock 94 may be arranged to determine the number of brewing cycles which are undergone by the brewing apparatus in any twenty-four hour day. Moreover, a record of the number of brewing cycles per twenty-four hour day will be maintained, and a record of the number of brewing cycles undergone by the brewing apparatus per twenty-four hour day for a predetermined number of consecutive twenty-four hour days will be maintained. It is a simple matter to initiate a display mode for those records by first successfully completing a conditioning sequence of switch manipulations, and then scrolling through the menu items available by continued manipulation of the appropriate switches in keeping with the data which are displayed on the display panel 100.

Likewise, the various preselected volumes of heated brew water to be delivered to the product are established by the microprocessor 42 and the timer 92, in the manner described above.

Obviously, it is possible for brewing apparatus in keeping with the present invention to be automated so that a particular function—a diagnostic function, a brewing operation, or otherwise—may be set to occur at any time. This is arranged by the real time clock and the timer means, in association with the microprocessor, to begin any preselected functional cycle of the brewing apparatus at a particular time of day and day of the week, as they are determined by the real time clock.

A filter 98 is shown in FIG. 4 as being in series with the controllable inlet valve 64. It has been noted above that the microprocessor 42 may be established, in one of its modes of operation, to keep a running total time that the controllable inlet valve 64 has been open. After a predetermined total time has been reached, a signal will be given by the microprocessor 42 to a suitable annunciator means—usually, to the display panel 100—that the water filter 98 may need to be changed. Alternatively, and in any event, after a predetermined period of time has elapsed in which the controllable inlet valve 64 has been open and, therefore, water has been admitted into the water heater tank 44, it may be appropriate for preventative maintenance to occur. That may require that the interior of the water heater tank 44, the heating element 46, and the other items in the water heater tank, be inspected for scale build-up and the like.

Figure 6:
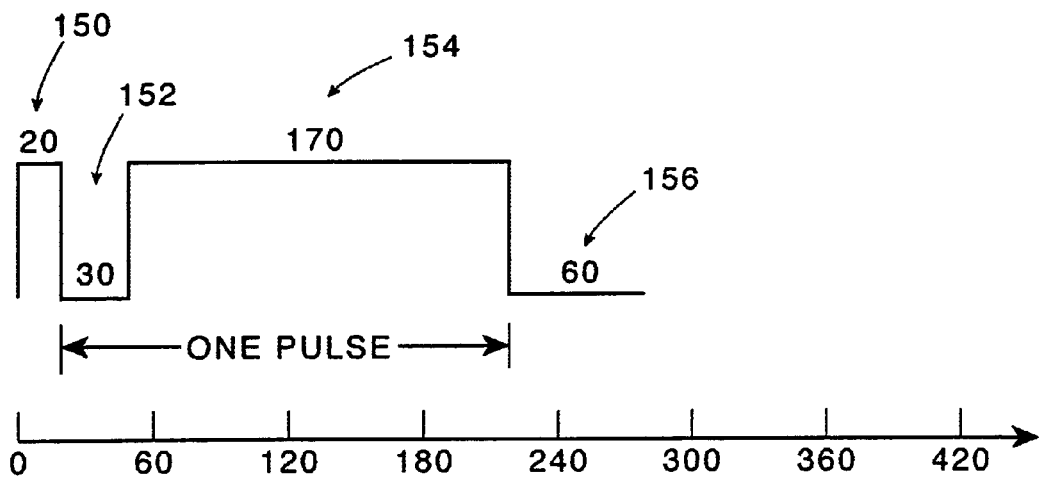
FIGS. 6, 7, and 8 show typical pulse cycles of three different specific operating parameters for a brewing apparatus in keeping with the present invention.
Figure 7:
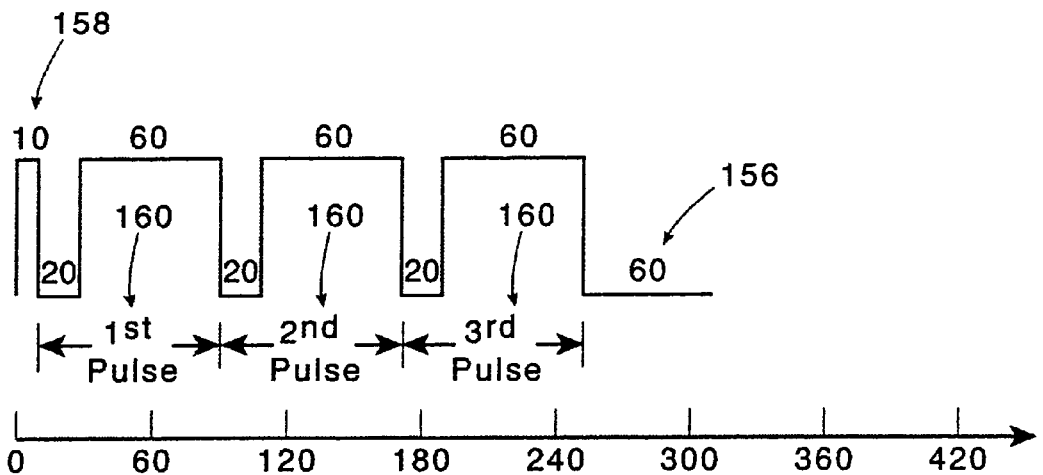
Figure 8:
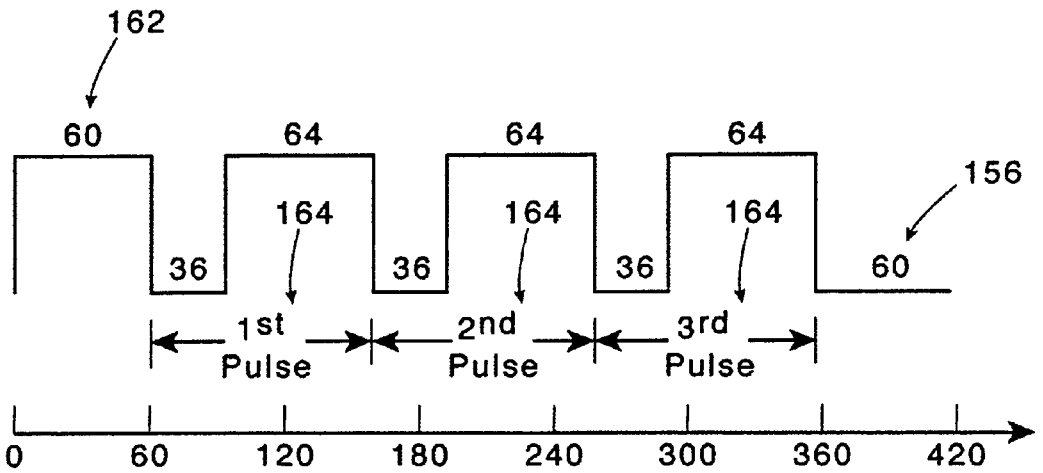

Finally, referring now to FIGS. 6, 7, and 8, several specific examples of pulse control, whereby certain specific operating parameters for specific predesignated operating features of the brewing apparatus may be established, resulting in a superior brewed coffee product in the examples being given.

It has been noted above that a specific secondary program function which is assigned to switch number 110, when the brewing apparatus control panel 90 is in a programming mode, is that specific pulse modes of operation may be selected. Three specific pulse modes of operation are illustrated in FIGS. 6, 7, and 8, for particular purposes and in respect of preselected quantities of heated brew water to be delivered to the product 48 in the brew chamber 50 of the brewing apparatus being operated. The intent is to control the controllable brew valve 70 by permitting it to open and close in keeping with a predetermined program for a number of seconds, while permitting the total valve time that the controllable valve is opened to be set at a specific predetermined length of time.

The example shown in FIG. 6 is one of pre-infusion or pre-soak of the coffee grounds (product 48) in the brew chamber 50. In this case, it is assumed that a sixty-four fluid ounce batch of coffee will be brewed, and that a total valve time of 190 seconds is required. Here, the controllable brew valve 70 is first opened for twenty seconds, as shown at 150, and it is then closed for an additional thirty seconds as shown at 152. Thereafter, the controllable brew valve 70 is again opened for 170 seconds, giving a total open valve time of 190 seconds. An additional drip out time of sixty seconds is shown at 156, which permits the entire charge of heated brew that has been delivered to the brew chamber to pass through the brew chamber and into the selected carafe 14 (in this case) so as to complete the brewing cycle. The total elapsed time, in this case, is 280 seconds. The advantage is that, in the first fifty seconds, a small amount of heated brew water has been permitted to contact the coffee grounds 48, and to pre-infuse or pre-soak those grounds so as to result in an improved flavor extraction.

FIG. 7 shows yet another pulse arrangement for improved flavor extraction, whereby the heated brew water is permitted to have an extended contact time with the coffee grounds 48 in the brew chamber 50. In this case, there is an intermittent delivery of the heated brew water to the product, having an initial delivery of ten seconds as shown at 158, followed by three consecutive pulses 160, each having an off time of twenty seconds and an on time of sixty seconds for the controllable brew valve 70, followed once again by a drip out period of sixty seconds. Here, once again, a standard sixty-four fluid ounce batch has been brewed, with a total valve time of 190 seconds. However, the total elapsed time is 310 seconds, in this case, including a total delay of sixty seconds and a drip out period of sixty seconds together with 190 seconds of valve required to deliver the sixty-four fluid ounce batch of heated brew water.

A further example is shown in FIG. 8 where, in this case, an 85 fluid ounce batch is to be brewed into a thermal server 23A or 23B, with a total valve time for the controllable brew valve of 252 seconds being required. Here, the intent is to preclude overflow of the brew chamber 50. Particularly if a large amount of coffee grounds is used, and/or fine ground coffee is used, overflow problems may be experienced. By adopting the overflow presentation pulse brew cycle such as that discussed with respect to FIG. 8, overflow or flooding of the brew chamber 50 can be precluded. In this case, as noted, the total valve time is intended to be 252 seconds for delivery of 85 fluid ounces of water. An initial valve time is arbitrarily set at sixty seconds shown at 162, and then three pulses 164 each comprising a delay of 36 seconds and a delivery period for heated brew water of 64 seconds follows. Once again, a sixty second drip out time is also provided for, resulting in a total elapsed time for the brew cycle of 420 seconds, but with overflow of the brew chamber 50 having been precluded.

There has been described a number of features of a computer controlled brewing apparatus in keeping with the general principles of the present invention, as defined in the accompanying claims.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. Apparatus for brewing a beverage and, when the beverage to be brewed is to be a warm beverage, for keeping a brewed beverage warm, wherein a beverage is brewed by heating water and delivering heated brew water to a product to be brewed by passing said heated brew water through said product to extract flavor therefrom, and dispensing a brewed product into a brewed beverage container therefor;

wherein said apparatus comprises a microprocessor, a water heater tank having a controllable heating element therein, delivery means operatively coupled to said water heater tank to initiate a brewing cycle and to deliver a predetermined volume of heated brew water which is heated at least to a first predetermined temperature below boiling to said product during each selected brewing cycle, temperature detection means for determining the temperature of said heated water at any time under the control of said microprocessor and for initiating a heating cycle for said heated water whenever its temperature drops below a second predetermined temperature which is lower than said first predetermined temperature, and actuator means to preclude delivery of said heated water to said product when the temperature thereof is below said second predetermined temperature, said apparatus further comprising:

a brew chamber for retaining said product therein, wherein heated brew water will pass through said product in order to extract flavor therefrom, and wherein said heated brew water subsequently will pass from said brew chamber into said brewed beverage container;

a controllable inlet valve for water entering said heater tank, said inlet valve being under the control of said microprocessor, whereby said controllable inlet valve can be opened or closed in keeping with signals sent thereto by said microprocessor;

a controllable brew valve for delivery of said heated brew water to said product, said brew valve being under the control of said microprocessor, whereby said controllable brew valve can be opened or closed in keeping with signals sent thereto by said microprocessor;

a control panel for said microprocessor, said control panel having a plurality of switches each having a designated primary program function for controlling a specific predesignated operating function of said brewing apparatus; and wherein, upon successful completion of a predetermined sequence of switch manipulations, each of said plurality of switches also has a designated secondary program function for controlling said microprocessor in setting further specific operating parameters for said brewing apparatus so as to enable respective specific predesignated operating features thereof;

timer means associated with said microprocessor; and a real time clock associated with said microprocessor for permitting real time setting of any function requiring a real time setting control under the control of said microprocessor;

wherein said microprocessor may be controlled so that the specific predesignated operating functions of said brewing apparatus, and specific predesignated operating features of said brewing apparatus, may be preset for a specific type of brewing apparatus.

2. The apparatus of claim 1, wherein the specific type of brewing apparatus is chosen from the group consisting of decanter coffee brewers, thermal coffee brewers, airpot coffee brewers, iced tea brewers, hot tea brewers, hot soup brewers, and satellite coffee brewers.

3. The apparatus of claim 1, wherein said plurality of switches is six switches.

4. The apparatus of claim 1, wherein said temperature detection means comprises a temperature probe inserted into said water heater tank, said temperature probe being adapted to determine the temperature of water in said heater tank at any instant in time, and to provide a signal indicative of that temperature to said microprocessor under the control thereof.

5. The apparatus of claim 1, further comprising a water level sensor near the top of said water heater tank, said water level detector being adapted to sense the presence or absence of water in said tank at the level therein where said water level sensor is placed, and to provide a signal indicative of the presence or absence of water at said water level sensor to said microprocessor under the control thereof.

6. The apparatus of claim 1, further comprising an LCD display panel associated with said microprocessor for display of data output from said microprocessor under the control thereof.

7. The apparatus of claim 6, where said microprocessor may be controlled by said plurality of switches to determine the nature of the data being displayed by said LCD display panel at any instant in time.

8. The apparatus of claim 1, wherein each of said controllable inlet valve and said controllable brew valve is a solenoid operated valve, wherein the respective solenoid is energized under the control of said microprocessor so as to open that valve, and wherein said valve remains open only when its respective solenoid is energized, whereby each of said controllable inlet valve and said controllable brew valve may be opened at any instant in time under the control of said microprocessor.

9. The apparatus of claim 8, wherein the solenoid of each of said solenoid operated controllable inlet valve and said controllable brew valve has a pair of triacs in series therewith;

wherein, when either of said controllable inlet valve and said controllable brew valve is not open under the control of said microprocessor, a first one of said pair of triacs associated with that respective valve is periodically opened and the other of said pair of triacs associated with that respective valve is closed under the control of said microprocessor, and the microprocessor tests to determine if the respective solenoid associated with that respective valve is energized, and then a second one of said pair of triacs associated with that respective valve is opened and the other of said pair of triacs associated with that respective valve is closed under the control of said microprocessor, and the microprocessor tests to determine if the respective solenoid associated with that respective valve is energized; and wherein, if under either condition of one of said pair of triacs being opened and the other of said pair of triacs being closed, for that respective valve, said microprocessor determines that the respective solenoid for that respective valve is energized, said microprocessor will cause the operation of said brewing apparatus to stop forthwith, and will cause an alarm indication to be given on an alarm indicator associated with said brewing apparatus.

10. The apparatus of claim 1, wherein, at the beginning of a selected brewing cycle, said controllable brew valve is opened under the control of said microprocessor and said timer means for a short period of time so as to allow a small amount of heated brew water to pre-infuse said product by soaking it with said small amount of heated brew water.

11. The apparatus of claim 1, further comprising a by-pass water delivery means connected in water receiving relation to said water heater tank and terminating in a by-pass water outlet disposed in direct water-dispensing relation to said brewed beverage container below said brew chamber, said by-pass water delivery means having a selectively operable by-pass water valve to control the flow of by-pass water from said by-pass water outlet directly into said brewed beverage container under the control of said microprocessor.

12. The apparatus of claim 1, wherein said microprocessor pulses said controllable brew valve in association with said timer means so as to produce an intermittent delivery of said heated brew water to said product, whereby said product in said brew chamber may be exposed to said heated brew water for a longer period of time in any selected brewing cycle, and whereby overflow of said brew chamber by said heated brew water may be substantially precluded.

13. The apparatus of claim 1, wherein said microprocessor and said real time clock are arranged to determine the number of brewing cycles undergone by said brewing apparatus per 24 hour day, and to maintain a record of the number of brewing cycles undergone by said brewing apparatus per 24 hour day for a predetermined number of consecutive 24 hour days.

14. The apparatus of claim 1, wherein said microprocessor and said timer means may be arranged to control said controllable brew valve to deliver one of a plurality of preselected volumes of heated brew water to said product.

15. The apparatus of claim 1, wherein said microprocessor, said real time clock, and said timer means, may be arranged to begin any preselected functional cycle of said brewing apparatus, depending on the time of day and the day of the week, as determined by said real time clock.

16. The apparatus of claim 1, further comprising a water filter in series with said controllable inlet valve, and wherein said microprocessor and said timer means may be arranged to keep a running total time that said controllable inlet valve has been open, so that when a predetermined total time has been reached, a signal is given by said microprocessor to annunciator means therefor so as to warn that said water filter needs to be changed.

17. The apparatus of claim 3, wherein each of said six switches has a respective designated secondary program function assigned thereto, as follows:

| SWITCH NO. | SECONDARY PROGRAM FUNCTION |
| --- | --- |
| 1 | Advance to next menu |
| 2 | Exit programming mode |
| 3 | Select item and advance to next item |
| 4 | Select pulse mode of operation |
| 5 | Decrement value of parameter in that menu item |
| 6 | Increment value of parameter in that menu item. |

18. The apparatus of claim 1, further comprising warming means for keeping a brewed beverage warm, wherein said warming means is chosen from the group consisting of at least one warmer plate on which a carafe of brewed beverage may be placed, at least one thermal carafe, at least one airpot, and at least one satellite container for brewed beverages.

* * * * *